US007967195B2

(12) United States Patent  
Mascavage et al.

(10) Patent No.: US 7,967,195 B2
(45) Date of Patent: Jun. 28, 2011

(54) METHODS AND SYSTEMS FOR PROVIDING GUARANTEED MERCHANT TRANSACTIONS

(75) Inventors: John Joseph Mascavage, Bellevue, WA (US); Margaret Morgan Weichert, Charlotte, NC (US); Robert Hogan, New Rochelle, NY (US)

(73) Assignee: First Data Corporation, Greenwood Village, CO (US)

( * ) Notice: Subject to any disclaimer, the term of this patent is extended or adjusted under 35 U.S.C. 154(b) by 857 days.

(21) Appl. No.: 11/924,828

(22) Filed: Oct. 26, 2007

(65) Prior Publication Data

US 2008/0052235 A1 Feb. 28, 2008

Related U.S. Application Data

(63) Continuation of application No. 11/105,167, filed on Apr. 12, 2005.

(60) Provisional application No. 60/566,486, filed on Apr. 28, 2004.

(51) Int. Cl.
*G06K 5/00* (2006.01)
*G06K 19/00* (2006.01)
*G06Q 40/00* (2006.01)
*G06Q 20/00* (2006.01)

(52) U.S. Cl. ..... 235/380; 235/382; 235/487; 235/382.5; 705/38; 705/78; 705/39

(58) Field of Classification Search ............ 705/26, 705/39, 40, 38, 78, 64, 77, 79; 235/380, 235/382, 487
See application file for complete search history.

(56) References Cited

U.S. PATENT DOCUMENTS

| 5,334,823 | A  | * | 8/1994  | Noblett et al. ............... 235/380 |
| 5,428,210 | A  |   | 6/1995  | Nair et al. |
| 5,432,326 | A  |   | 7/1995  | Noblett, Jr. et al. |
| 5,448,047 | A  |   | 9/1995  | Nair et al. |
| 5,903,882 | A  |   | 5/1999  | Asay et al. |
| 5,914,472 | A  |   | 6/1999  | Foladare et al. |
| 6,163,771 | A  |   | 12/2000 | Walker et al. |
| 6,254,000 | B1 |   | 7/2001  | Degen et al. |
| 6,783,065 | B2 |   | 8/2004  | Spitz et al. |
| 6,886,741 | B1 | * | 5/2005  | Salveson ........................ 235/375 |
| 6,999,943 | B1 | * | 2/2006  | Johnson et al. ................. 705/39 |
| 7,043,441 | B1 |   | 5/2006  | Maher |
| 7,104,443 | B1 | * | 9/2006  | Paul et al. ....................... 235/380 |
| 7,191,149 | B1 | * | 3/2007  | Lanham et al. ................. 705/38 |
| 7,191,151 | B1 |   | 3/2007  | Nosek |
| 7,194,437 | B1 | * | 3/2007  | Britto et al. ...................... 705/40 |
| 2001/0034702 | A1 |   | 10/2001 | Mockett et al. |
| 2001/0034720 | A1 |   | 10/2001 | Armes |
| 2001/0044787 | A1 | * | 11/2001 | Shwartz et al. ................. 705/78 |
| 2002/0013765 | A1 |   | 1/2002  | Shwartz |
| 2002/0040344 | A1 | * | 4/2002  | Preiser et al. ................... 705/42 |

(Continued)

*Primary Examiner* — Daniel Walsh
(74) *Attorney, Agent, or Firm* — Kilpatrick Townsend & Stockton LLP (57) ABSTRACT

A network arrangement is provided for processing credit transactions. A financial network is used to route communications securely between interfaces with the financial network. Merchant systems are coupled with the interfaces, with each merchant system transmitting requests for authorization of credit transactions through the financial network. An issuer system authorizes credit transactions in response to receipt of requests that specify at least a credit account to be used to support a particular credit transaction and a transaction amount for the particular credit transaction. A guarantor system separate from the issuer system determines whether to guarantee credit transactions in response to the requests and transmits responses indicating whether specific credit transactions are to be guaranteed through the financial network to the merchant systems.

10 Claims, 5 Drawing Sheets

U.S. PATENT DOCUMENTS

| | | | |
|---|---|---|---|
| 2002/0120582 A1 | 8/2002 | Elston et al. | |
| 2002/0123938 A1 | 9/2002 | Yu et al. | |
| 2002/0139837 A1 | 10/2002 | Spitz et al. | |
| 2003/0004819 A1* | 1/2003 | Dutta et al. | 705/26 |
| 2003/0023541 A1* | 1/2003 | Black et al. | 705/37 |
| 2003/0046224 A1 | 3/2003 | Mujtaba et al. | |
| 2003/0083986 A1 | 5/2003 | Kobayashi | |
| 2003/0093367 A1 | 5/2003 | Allen-Rouman et al. | |
| 2003/0101134 A1 | 5/2003 | Liu et al. | |
| 2003/0126075 A1 | 7/2003 | Mascavage, III et al. | |
| 2003/0172027 A1 | 9/2003 | Scott | |
| 2003/0183689 A1* | 10/2003 | Swift et al. | 235/380 |
| 2003/0233292 A1 | 12/2003 | Richey et al. | |
| 2004/0030644 A1* | 2/2004 | Shaper | 705/39 |
| 2004/0031856 A1 | 2/2004 | Atsmon et al. | |
| 2004/0049455 A1 | 3/2004 | Mohsenzadeh | |
| 2004/0059952 A1* | 3/2004 | Newport et al. | 713/202 |
| 2004/0064405 A1 | 4/2004 | Weichert et al. | |
| 2004/0199462 A1 | 10/2004 | Starrs | |
| 2004/0210527 A1* | 10/2004 | Woda et al. | 705/40 |
| 2004/0230527 A1 | 11/2004 | Hansen et al. | |
| 2004/0260644 A1 | 12/2004 | Doerner | |
| 2005/0131816 A1* | 6/2005 | Britto et al. | 705/39 |
| 2005/0192901 A1 | 9/2005 | McCoy et al. | |
| 2005/0234833 A1 | 10/2005 | VanFleet et al. | |
| 2005/0278244 A1 | 12/2005 | Yuan | |
| 2005/0279827 A1* | 12/2005 | Mascavage et al. | 235/380 |
| 2006/0016880 A1 | 1/2006 | Singer et al. | |
| 2006/0026097 A1 | 2/2006 | Nethery, III | |
| 2006/0031161 A1 | 2/2006 | D'Agostino | |
| 2006/0143121 A1 | 6/2006 | Treider et al. | |
| 2006/0229961 A1 | 10/2006 | Lyftogt et al. | |
| 2007/0045407 A1* | 3/2007 | Paul et al. | 235/380 |
| 2007/0143227 A1 | 6/2007 | Kranzley et al. | 705/67 |
| 2007/0156577 A1* | 7/2007 | Lanham et al. | 705/38 |
| 2007/0174164 A1* | 7/2007 | Biffle et al. | 705/35 |
| 2007/0174208 A1* | 7/2007 | Black et al. | 705/75 |
| 2008/0133419 A1* | 6/2008 | Wormington et al. | 705/64 |
| 2010/0138312 A1* | 6/2010 | Britto et al. | 705/26 |

* cited by examiner

METHODS AND SYSTEMS FOR PROVIDING GUARANTEED MERCHANT TRANSACTIONS

CROSS REFERENCE TO RELATED APPLICATION

This application is a continuation of U.S. patent application Ser. No. 11/105,167, filed Apr. 12, 2005, entitled "Methods And Systems For Providing Guaranteed Merchant Transactions," which is a non-provisional of and claims the benefit of U.S. Provisional Patent Application No. 60/566,486, filed Apr. 28, 2004, entitled "Methods And Systems For Providing Guaranteed Merchant Transactions," the entire disclosure of each of which is incorporated herein by reference for all purposes.

BACKGROUND OF THE INVENTION

This application relates generally to merchant transactions. More specifically, this application relates to methods and systems for providing guaranteed merchant transactions.

Currently, about 31% of all purchases in the United States are made using payment cards, such as credit, debit, and stored value cards, with the remaining purchases being made in cash (about 38%) and by check (about 27%). Although it is not always evident to many consumers, there is a significant difference in different types of transaction types, in that some transactions are "guaranteed" to the merchant while others are not. As used herein, a "guaranteed" transaction is one in which a merchant is a party to the transaction and in which the risk of loss resulting from successful repudiation is borne by someone other than the merchant party. The most obvious guaranteed transactions are thus those made in cash, where the merchant receives the funds at the time of the purchase directly. Check-based transactions may also be guaranteed transactions when supported by services such as TeleCheck®. With respect to card-based transactions, debit transactions made using a debit card are generally guaranteed transactions because part of the transaction includes a transfer of funds from a customer's account to the merchant's account at the time of the transaction.

Credit-card transactions are the prime example of transactions that are not guaranteed. Such transactions typically proceed by having a customer present a credit card, with a receipt of the transaction being presented later by the merchant to a financial institution for payment. Settlement of the transaction involves an issuer of the credit card making the payment and extending credit to the customer, eventually recovering payment for the transaction, and perhaps also a finance charge, from the customer in accordance with a cardholder agreement. Until payment is made to the merchant, however, there remains the possibility that the legitimacy of the transaction may be repudiated, such as by an allegation that the credit card had been stolen, was forged, and the like. The lack of a guarantee thus puts the risk of being defrauded onto the merchant.

The protocol for executing transactions sometimes includes safeguards intended to reduce the chance of fraud, but such safeguards are of limited effectiveness. For example, a merchant may seek preauthorization for a transaction by using a network infrastructure to transmit some details of the transaction, such as the credit-card number and a transaction amount, to the issuer. Preauthorization may include verifying that the card number is a valid card number, verifying that the credit account identified by the card number has an open status, and verifying that the credit account has on "open to buy" status on the credit limit. In some instances, such as where an address is provided as part of an address-verification service ("AVS"), the preauthorization may additionally include verifying that the billing address for the credit account matches the address on file for the account holder. Similarly, for certain transactions such as non-face-to-face transactions, a card validation value ("CVV"), often printed on the back of the credit card, may be provided and verified, providing some additional measure of validation that the purchaser is in possession of the card.

Thus, if the transaction amount is less than the available credit on the account and the card has no derogatory marks indicating its theft and the like, the transaction may be authorized. Such authorization does not necessarily protect the merchant, however, from presentment of a stolen credit card whose theft has not been reported, or from a variety of other fraud schemes. Legitimate bases may be asserted by the true cardholder to establish that the use of the card was fraudulent, with the risk of such an assertion for every transaction being borne by the merchant. For this reason, some merchants may refuse to accept credit cards or may institute procedures to encourage the use of debit cards over credit cards, but such activities sometimes have the effect of discouraging consumers from purchasing at all from those merchants.

In recent years, dangers of fraud perpetrated on merchants have received even more attention because of the evolution of electronic commerce on the Internet, the increase in mail-order and telephone-order transactions, and the like. Such transactions are examples of transactions where the credit card itself is not even presented, and in this way are similar to more traditional telephone and mail-order purchases. A typical electronic transaction proceeds similarly to the transaction described above, but the credit-account number is provided by the customer rather than being extracted directly from the card. Confirmatory information, such as cardholder name, expiry date, and/or identification of a security code printed on the back of the credit card, may sometimes also be collected to try to limit transactions to being executed by the cardholder in possession of the card. A somewhat more sophisticated version of the security-code method has recently been proposed by allowing cardholders to register their cards with a secret password that is not printed on the card. With such a system, registered credit accounts may only be used when the secret password is also provided at the time of transaction. One such method is currently being promoted under the name "Verified by Visa." While such techniques have the potential of adding greater security to online transactions, they require special registration by the customer and the maintenance of the secret password. In addition, the "Verified by Visa" method currently covers only a small set of chargeback reason codes (two codes), leaving a large number of other potential chargeback codes unaddressed.

There accordingly remains a general need in the art for methods and systems that provide convenient guaranteed transactions to merchants for credit transactions.

BRIEF SUMMARY OF THE INVENTION

Embodiments of the invention thus provide a network arrangement that may be used for processing credit transactions. A financial network is used to route communications securely between interfaces with the financial network. A plurality of merchant systems are coupled with the interfaces, with each such merchant system being adapted to transmit requests for authorization of credit transactions through the financial network. An issuer system is coupled with at least one of the interfaces, and is adapted to authorize credit transactions in response to receipt of requests that specify at least a credit account to be used to support a particular credit transaction and a transaction amount for the particular credit transaction. A guarantor system separate from the issuer system is also coupled with at least one of the interfaces. The guarantor system is adapted to determine whether to guarantee credit transactions in response to the requests for authorization of credit transactions and to transmit responses indicating whether specific credit transactions are to be guaranteed through the financial network to the merchant systems.

In some embodiments, each merchant system may be adapted to transmit the requests for authorization through the financial network to the issuer system. In other embodiments, the network arrangement further comprises a merchant-bank system coupled with at least one of the interfaces; the merchant-bank system is controlled by a financial institution that holds a depository account on behalf of a merchant that controls at least one of the merchant systems. The merchant systems may be interfaced with point-of-sale devices adapted to read information defining the credit account from a credit card. Alternatively, the merchant systems may be interfaced with a public network through which a customer may provide information defining the credit account.

The network arrangement may be used in methods for processing a credit transaction by a merchant. In one set of embodiments, information defining a credit account to be used to support the credit transaction is received with a merchant system. A request for authorization of the credit transaction is transmitted with the merchant system over a financial network; the request includes the information defining the credit account and a transaction amount for the transaction. A response to the request is received with the merchant system over the financial network. The response identifies whether an issuer of the credit account has authorized the credit transaction and whether a guarantor separate from the issuer has guaranteed payment of the transaction amount for the transaction to the merchant.

In some such embodiments, the response may be received from a guarantor system controlled by the guarantor. In other embodiments, a first portion of the response may be received from an issuer system controlled by the issuer and a second portion of the response may be received from a guarantor system controlled by the guarantor. The information defining the credit account may be read from a credit card presented to the merchant or may be received over an interface to the merchant system from a customer located remotely from the merchant in different embodiments. In one embodiment, the request for authorization of the credit transaction is transmitted from the merchant system to an issuer system controlled by the issuer.

In another set of embodiments, a request for authorization of a credit transaction between the merchant and a customer is received with a guarantor system. The request includes an identification of a credit account used to support the credit transaction, a transaction amount for the transaction, and an authorization for the transaction provided by an issuer of the credit account. A determination is made with the guarantor system whether to provide a guarantee of payment of the transaction amount to the merchant. A response to the request is transmitted from the guarantor system over a financial network indicating whether to guarantee payment of the transaction amount to the merchant.

In some such embodiments, the determination of whether to provide the guarantee is made by determining a risk of repudiation of the transaction by a holder of the credit account. The request for authorization may be received over the financial network from an issuer system controlled by the issuer or from a merchant system controlled by the merchant in different embodiments.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. In some instances, a sublabel is associated with a reference numeral and follows a hyphen to denote one of multiple similar components. When reference is made to a reference numeral without specification to an existing sublabel, it is intended to refer to all such multiple similar components.

DETAILED DESCRIPTION OF THE INVENTION

Embodiments of the invention provide methods and systems for providing guaranteed credit transactions, where the "guaranteed" nature of each transaction means that the risk of a valid repudiation of the transaction is borne by a party other than a merchant party to the transaction. This is achieved in embodiments of the invention by integrating a guarantor system within a network suitable for processing credit transactions with merchants. The guarantor system is equipped with modules that permit enhanced authorization techniques to be applied with a variety of risk filters so that the guarantor can determine whether to provide the guarantee. In exchange for the guarantee, the guarantor usually receives a small fee from the merchant, effectively providing a cost-based insurance to the merchant. The guarantor system may also be equipped with modules that improve adjudication of repudiations of transactions before payment is made on the guarantee.

Figure 1:
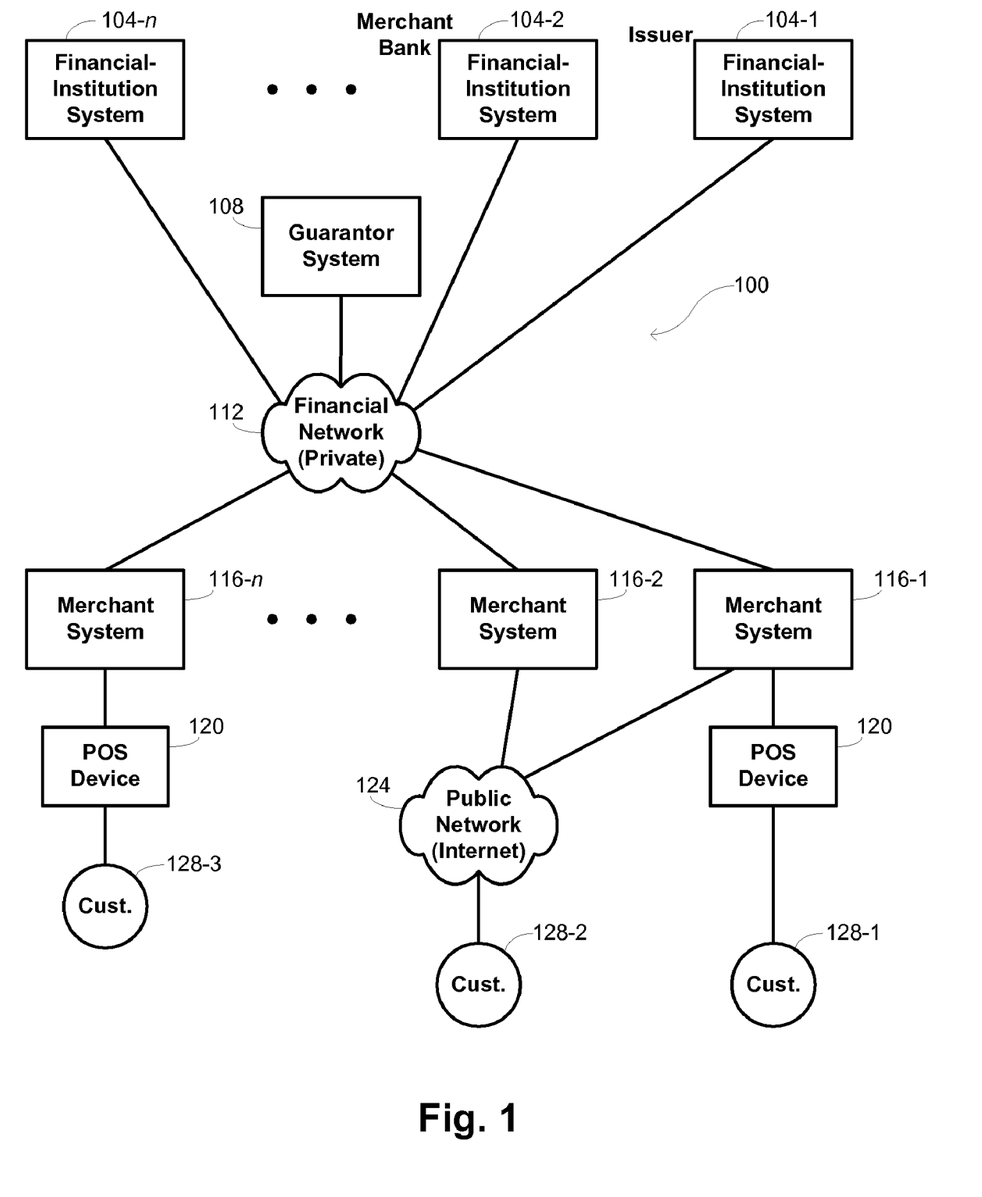
FIG. 1 is a schematic diagram of a network arrangement that may be used in some embodiments of the invention.

One example of a network arrangement in which a guarantor system has been integrated in accordance with embodiments of the invention is shown with the schematic diagram of FIG. 1. In this arrangement 100, a plurality of merchant systems 116 are provided in communication with a financial network 112. Usually the financial network is a private network having a variety of security protocols intended to protect the sensitive financial information being exchanged from interception by eavesdroppers. In many instances, for example, communications with the financial network 112 are encrypted. Each of the merchant systems 116 is generally also provided in communication with one or more transaction interfaces. In the case of brick-and-mortar transactions executed when a customer is physically present at a merchant location, the transaction interface may comprise a point-of-sale device 120 equipped to read information from a magnetic stripe of a card, to read information from a chip on a smart card, to read information optically from a card, and the like.

Examples of point-of-sale devices that include multiple functionality are described in the following commonly assigned applications, the entire disclosures of which are incorporated herein by reference for all purposes: U.S. Provisional Patent Application No. 60/147,889, filed Aug. 9, 1999, entitled "Integrated Point Of Sale Device"; U.S. patent application Ser. No. 09/634,901, filed Aug. 9, 2000, entitled "Point Of Sale Payment System"; U.S. patent application Ser. No. 10/116,689, filed Apr. 3, 2002, entitled "Systems And Methods For Performing Transactions At A Point-Of-Sale"; U.S. patent application Ser. No. 10/116,733, filed Apr. 3, 2002, entitled "Systems And Methods For Deploying a Point-Of-Sale System"; U.S. patent application Ser. No. 10/116,686, filed Apr. 3, 2002, entitled "Systems And Methods For Utilizing A Point-Of-Sale System"; and U.S. patent application Ser. No. 10/116,735, filed Apr. 3, 2002, entitled "Systems And Methods For Configuring A Point-Of-Sale System." In cases where the customer is not physically present, such as where a transaction is executed over a public network 124 like the Internet, the public network 124 itself may correspond to the transaction interface. Other examples of transaction interfaces that may be used when the customer is not physically present include telephone interfaces used to support telephone orders, and the like.

FIG. 1 provides examples of different types of merchants who may be equipped to accommodate different types of transactions. For instance, the merchant having merchant system 116-n is equipped only to accommodate brick-and-mortar transactions with a customer 128-3 through a point-of-sale transaction device 120. Transactions executed by such a merchant are thus restricted to "card-present transactions," in which the credit card is physically present for examination during the transaction itself. In contrast, the merchant having merchant system 116-2 is a purely online Internet retailer and is equipped only to accommodate transactions executed over the public network 124. In such transactions, a customer 128-2 provides only information about the credit card without the card actually being present to execute a so-called "card-not-present transaction." Some merchant systems, such as merchant system 116-1 may be equipped to interface with different types of transaction interfaces, such as with the public network 124 and with point-of-sale devices 120. Such merchant systems may accommodate a customer 128-1 who executes a card-present transaction at a merchant location, as well as a customer 128-2 who executes a card-not-present transaction over the Internet or telephone.

The financial network 112 is also interfaced with financial-institution systems 104 operated by financial institutions. Such financial institutions may act as depository institutions that provide services to one or more of the merchants and/or may act as issuers of credit cards to customers 128. To facilitate the discussion below, a specific embodiment is indicated in FIG. 1 in which financial-institution system 104-2 is operated by a merchant bank that provides services to one of the merchants, and in which financial-institution 104-1 is operated by a credit-card issuer that provides a credit account for one of the customers 128. Of course, both those institutions may act in other capacities as well, with the merchant bank also acting as an issuer to some customers and with the issuer acting as a merchant bank for other customers.

The guarantor system 108 is integrated into this network arrangement through an interface with the financial network 112, allowing it to exchange communications both with the merchant systems 116 and with the financial-institution systems 104. The guarantor system 108 may comprise a computational system having programming to implement methods for guaranteeing transactions and for settling guaranteed transactions. Such a computational system is described for certain embodiments with reference to FIGS. 2 and 3, which respectively show logical and physical structures that may be used in some embodiments.

Figure 2:
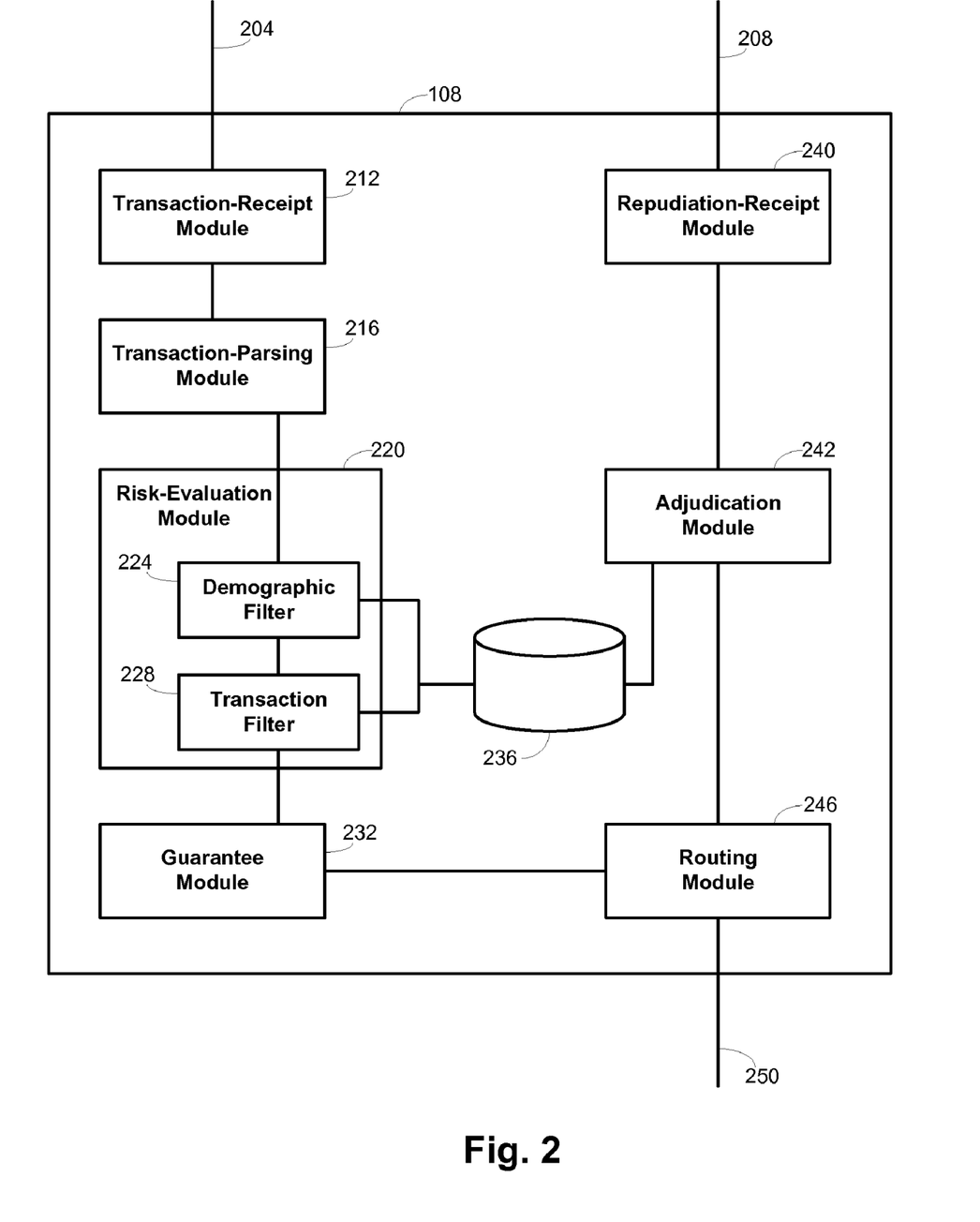
FIG. 2 is a schematic diagram illustrating a logical structure of a guarantor system that may be used in executing and settling guaranteed credit transactions in some embodiments.

For instance, FIG. 2 illustrates that the guarantor system 108 may comprise a plurality of logical modules for implementing methods of the invention. The modules on the left side of the drawing generally correspond to those modules that may be used in coordinating execution of guaranteed transaction, while the modules on the right side of the drawing generally correspond to those modules used in settling a previously guaranteed transaction.

In coordinating execution of a guaranteed transaction, information about the transaction may be received by a transaction-receipt module 212 over a first input interface 204. The information is parsed by a transaction-parsing module 216 so that the parsed information may be analyzed for risk factors by a risk-evaluation module 220. The risk-evaluation module may comprise one or more risk filters used in evaluating the risk of repudiation of a transaction. For example, a demographic filter 220 may apply demographic factors like age, occupation, income level, geographic location, and the like that are known to be correlated with relatively high or low levels of repudiation. Similarly, a transaction filter 228 may identify certain aspects of the transaction that are known to be correlated with relatively high or low levels of repudiation, such as the transaction amount, the nature of the product purchased, the type of merchant selling the product, the frequency of the transaction, the time of day of the transaction, hardware- and software-related parameters such as fingerprinting-type information captured by certain scanners, and the like. Of each of the factors may be used in the computation of a risk score, with those aspects correlated with high levels of repudiation tending to increase the score and those with aspects correlated with low levels of repudiation tending to decrease the score. Different aspects may be weighted in different ways by the risk-evaluation module, and the weighting factors may even vary on a transaction-by-transaction basis. For example, a transaction by Customer X known to have a history of repudiating transactions may weight those factors tending to decrease the risk score more heavily than for a transaction by Customer Y known rarely to repudiate a transaction. The application of the various filters may draw on information stored in a data store 236, that may record such information as the correlation levels with identified demographic, transactional, and other factors, a credit score or transaction history for individual customers, and the like.

Once the risk-evaluation module has generated a risk score for a particular transaction, a guarantee module 232 determines whether the transaction qualifies for a guarantee by the guarantor. In some instances, such a determination may be made simply on the basis of the risk score alone, while in other embodiments other factors may also be applied. The determination of the guarantee module 232 is routed as a response from the guarantor system 108 by a routing module 246 over output interface 250.

Similarly, as part of a method for settling a guaranteed transaction, a repudiation-receipt module 240 may receive information over a second input interface 208 that a particular guaranteed transaction has been repudiated by the cardholders. Generally, this information includes details of the transaction and reasons for the repudiation, and perhaps also detailed results of an investigation performed by an issuer suggesting that the repudiation is valid. An adjudication module 242 coordinates activity for determining whether the guarantor is obliged to pay the merchant for the repudiated transaction. In doing so, the adjudication module may access information from the data store 236. In some instances the adjudication may rely completely on the information received by the repudiation-receipt module 240, such as by honoring a conclusion of an issuer that the transaction was legitimately repudiated. In other instances, an independent adjudication may be initiated by the adjudication module 242 by issuing directions for collection of additional information, to verify an identity of the party to the transaction, address, and other factors known to be correlated with a fraud technique. Results of such investigations are received by the adjudication module 242, which determines the legitimacy of the repudiation and maintains records sufficient to establish the basis for its determination; maintaining such records is especially desired in circumstances where the repudiation is determined to be invalid so that the guarantor will refuse to pay. The determination is provided to the routing module 246 for transmission to appropriate parties as described below.

Figure 3:
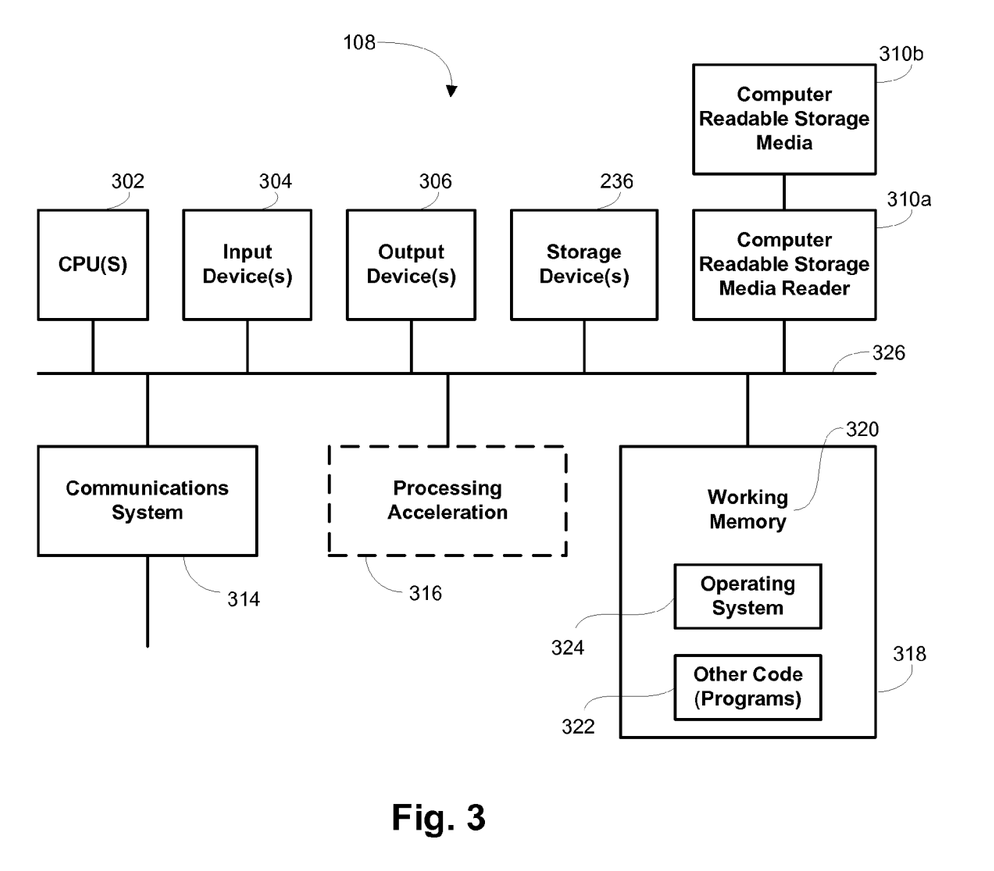
FIG. 3 is a schematic illustration of a physical structure of a guarantor system that may be used in executing and settling guaranteed credit transactions in some embodiments.

FIG. 3 provides a schematic illustration of a physical structure that may be used to implement the guarantor system 108. FIG. 3 broadly illustrates how individual system elements may be implemented in a separated or more integrated manner. The guarantor system 108 is shown comprised of hardware elements that are electrically coupled via bus 326, including a processor 302, an input device 304, an output device 306, the data store 236, a computer-readable storage media reader 310a, a communications system 314, a processing acceleration unit 316 such as a DSP or special-purpose processor, and a memory 318. The computer-readable storage media reader 310a is further connected to a computer-readable storage medium 310b, the combination comprehensively representing remote, local, fixed, and/or removable storage devices plus storage media for temporarily and/or more permanently containing computer-readable information. The communications system 314 may comprise a wired, wireless, modem, and/or other type of interfacing connection and permits data to be exchanged over input interfaces 204 and 208 and over output interface 250 to implement embodiments described herein.

The guarantor system 108 also comprises software elements, shown as being currently located within working memory 320, including an operating system 324 and other code 322, such as a program designed to implement methods of the invention. It will be apparent to those skilled in the art that substantial variations may be made in accordance with specific requirements. For example, customized hardware might also be used and/or particular elements might be implemented in hardware, software (including portable software, such as applets), or both. Further, connection to other computing devices such as network input/output devices may be employed.

Figure 4:
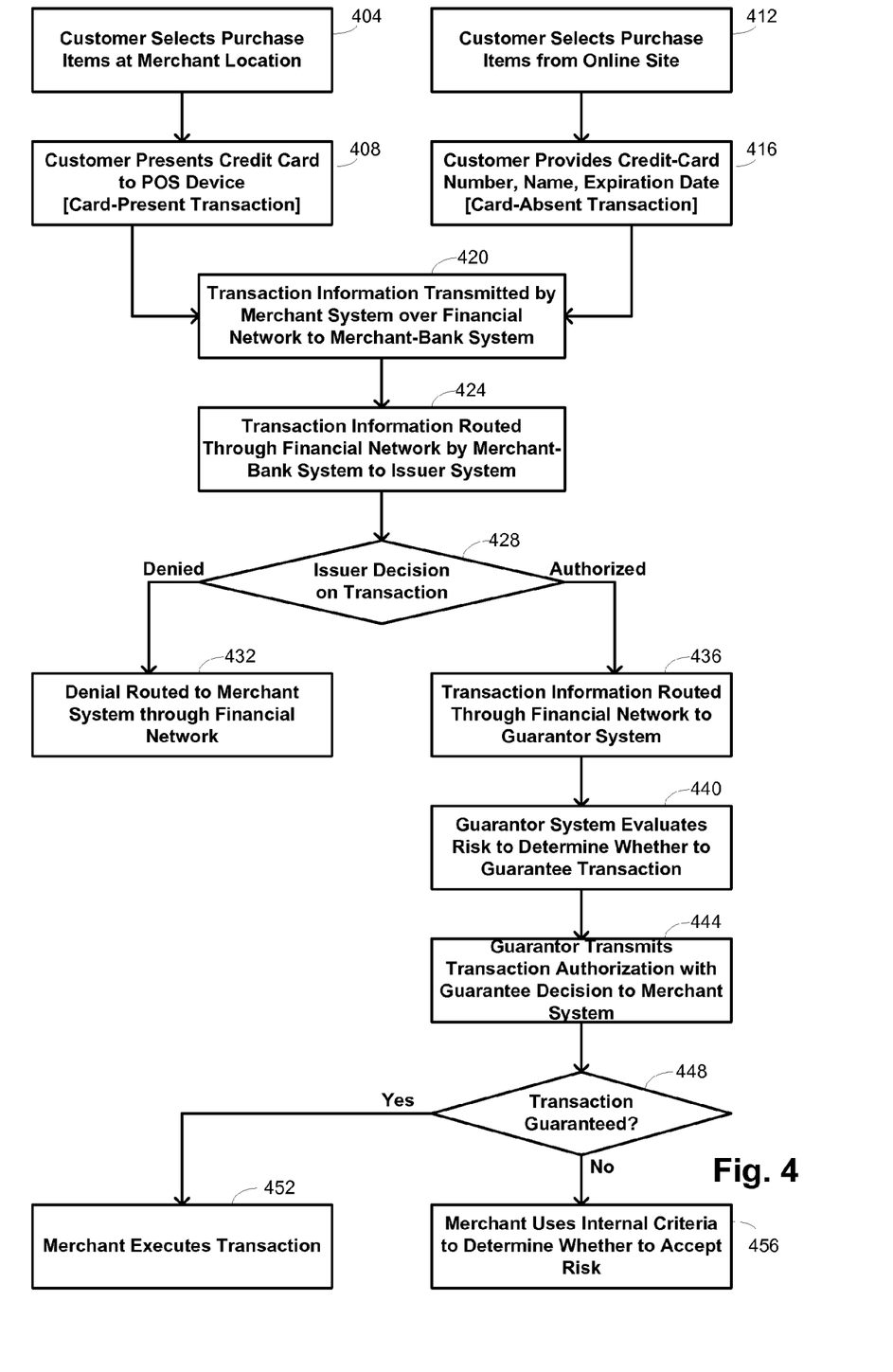
FIG. 4 is a flow diagram providing exemplary illustrations of methods for executing a guaranteed credit transaction in some embodiments.
Figure 5:
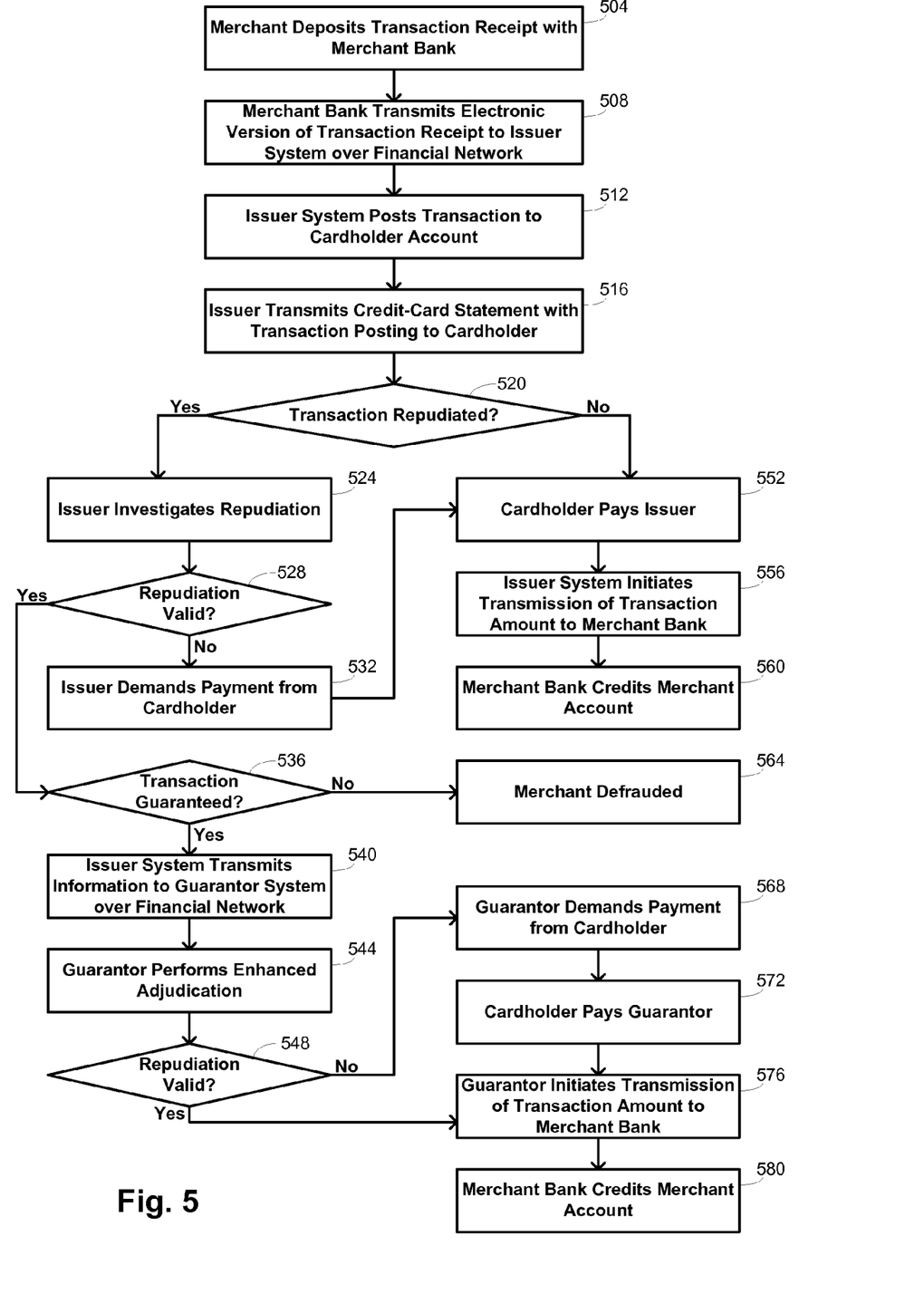
FIG. 5 is a flow diagram providing exemplary illustrations of methods for settling a guaranteed credit transaction in some embodiments.

FIGS. 4 and 5 provide flow diagrams that respectively illustrate methods for executing a guaranteed transaction and methods for settling a guaranteed transaction using the network arrangement 100 described in connection with FIGS. 1-3. As FIG. 4 illustrates, methods of the invention may accommodate both card-present transactions and card-not-present transactions. In the case of a card-present transaction, a customer may select items, including goods and/or services, for purchase at a merchant location at block 404. The customer presents his credit card for reading by the point-of-sale device, which extracts an account number and perhaps other identification from a magnetic stripe, embedded chip, or other storage medium at block 408. A package having transaction information is prepared, including such information as the account number and identification extracted from the credit card, a transaction amount, a listing of items purchased, and the like. The transaction package is transmitted by a merchant system 116 interfaced with the point-of-sale device over the financial network 112 to the merchant-bank system 104-2. Alternatively, in the case of a card-not-present transaction, a customer may select items for purchase from an online Internet shopping site at block 412. The customer communicates identification information printed on the credit card, such as the credit-card number, his name, and the expiration date, at block 416 over an interface connected with a merchant system 116. In the case of an online purchase, the interface may comprise the Internet and in the alternative case of a catalog purchase, the interface may comprise a telephone interface. At block 420, transaction information is prepared in the same fashion as for a card-present transaction, i.e. by preparing a packet having such information as account number, transaction amount, items purchased, and the like, and transmitted over the financial network 112 to the merchant-bank system 104-2.

For both card-present and card-not-present transactions, the merchant-bank system 104-2 identifies the issuer from the received information and routes it or a subset of it to the appropriate issuer system 104-1 over the financial network 112 at block 424. The information thus provided to the issuer system 104-3 permits the issuer system 104-1 to determine at block 428 whether to authorize the transaction in accordance with a cardholder agreement between the issuer and cardholders. Such a decision typically turns on such factors as whether the transaction amount is less than an available credit amount and whether the credit account is free of derogatory marks that indicate such things as delinquency on the part of the cardholder, unusual levels of activity on the account (particularly in unusual geographic locations) suggesting fraudulent activity, and the like. If the transaction is denied by the issuer, a denial code is routed by the issuer system 104-1 through the financial network 112 to the merchant system 116 that originated the transaction at block 432. Normally, the merchant will decline the credit transaction upon receipt of a denial code or will allow the customer to provide an alternative method of payment for the selected items.

If the issuer authorizes the transaction, the transaction information may be routed through the financial network 112 to the guarantor system 108 at block 436, together with an approval code generated by the issuer system 104-1. Using the methods described above, the guarantor system 108 evaluates risk factors at block 440 to determine whether the transaction is one that meets criteria for providing a guarantee. In some instances, the cost for providing a guarantee of the transaction may vary according to the determined risk level, so that the possibility of obtaining a guarantee is still provided to the merchant, but at a cost that reflects the increased risk. The guarantor system 108 transmits the transaction authorization together with its guarantee decision to the merchant system 116 that originated the transaction request at block 444. If the transaction is guaranteed under conditions acceptable to the merchant, as checked at block 448, the merchant executes the transaction at block 452. If the guarantor is unwilling to guarantee the transaction, or if the guarantee is offered under conditions unacceptable to the merchant, the merchant may still have the option of accepting the risk of loss at block 456 using internal decision-making criteria. Since the transaction has been authorized by the issuer despite the lack of guarantee, a decision by the merchant to execute the transaction and accept the risk is similar to execution of a traditional authorized credit transaction. In many instances, however, the risk evaluation performed by the guarantor system 108 will be recognized by the merchant to be a reliable indicator of risk levels so that the merchant will decline to execute the transaction in the absence of a guarantee.

While FIG. 4 indicates one specific order for the routing of transaction information, it should be appreciated that other routings may be performed without exceeding the scope of the invention. For example, in some embodiments, the transaction information may not be routed to the merchant-bank system initially, being instead routed directly from the merchant system to the issuer system. In other embodiments, transaction information may be routed to the issuer system and guarantor system simultaneously, with a transaction being executed only if a positive response is received from both; such simultaneous routing may increase the speed of executing a transaction, but requires the risk-analysis techniques used by the guarantor system 108 to be applied even for transactions that are denied by the issuer system. Still other variations in the order of the functions included in FIG. 4 will be evident to those of skill in the art, as will be functions that may be omitted in some embodiments and supplementary functions that may be performed in some embodiments.

After a guaranteed transaction has been executed, it may be settled so that the appropriate parties pay and are paid for the transaction in accordance with the relevant agreements. FIG. 5 provides an overview of settlement functions in some embodiments, although, as for the methods described in connection with FIG. 4, various additional functions may be performed in some embodiments, various functions may be omitted in some embodiments, and various functions may be performed in a different order in some embodiments. Settlement of a particular transaction may begin at block 504 with the merchant depositing a receipt of the transaction with its financial institution, the merchant bark 104-2. At block 508, the merchant bank 104-2 transmits an electronic version of the transaction receipt to the issuer system 104-1 over the financial network 112. This electronic version might include an image reproduction of the transaction receipt or might be comprise descriptive text setting forth relevant particulars of the transaction receipt.

At block 512, the issuer system 104-1 posts the transaction to the cardholder's account and later transmits a credit-card statement to the cardholder at block 516 that includes the transaction, and usually several additional transactions executed within a defined period. Under most circumstances, all of the transactions set forth on the cardholder statement will be accepted by the cardholder as legitimate charges, as checked at block 520, so that the cardholder will provide payment towards the outstanding balance of the credit account by a specified due date at block 552. The issuer system 104-1 accordingly initiates transmission of the transaction amount to the merchant bank 104-2 at block 556, and the merchant bank 104-2 credits the merchant account at block 560. While transmission of funds to the merchant bank 104-2 and crediting of the merchant account are shown in FIG. 5 to occur after the cardholder has reviewed his statement, in many instances such crediting will occur much earlier in the process. When such crediting is performed earlier, a successful repudiation of the transaction by the cardholder may require a refund if the transaction was not guaranteed; it is thus particularly convenient to perform the crediting earlier for at least all guaranteed transactions, and even for some nonguaranteed transactions since most of those will not be repudiated in any event.

If the transaction is repudiated by the cardholder at block 520, usually by the cardholder informing the issuer that the transaction was not executed by the cardholder or authorized by the cardholder, the issuer will investigate the repudiation at block 524. Such an investigation may be performed at a relatively high level, checking such things as the account number on the transaction receipt, checking the signature on the transaction receipt, and the like, or may be performed at a more detailed level in some embodiments. If the investigation results in a determination that the repudiation is not valid, as checked at block 528, the issuer may demand payment from the cardholder at block 532, with the expectation that the cardholder will pay as described previously so that the merchant account may be properly credited. Continued failure of the cardholder to pay for the transaction may result in recovery actions against the cardholder in accordance with the cardholder agreement.

If the repudiation is valid, the ability for the merchant to recover the transaction amount depends on whether the transaction was guaranteed. If not, as checked at block 536, then the merchant has been defrauded as indicated at block 564. If the transaction was guaranteed, however, then responsibility for making the merchant whole rests with the guarantor. Accordingly, at block 540, the issuer system 104-1 transmits information to the guarantor system 108 over the financial network 112. This information may include the electronic version of the transaction receipt, details of the repudiation supplied by the cardholder, details of the investigation that was performed by the issuer and the results of that investigation, and the like. This information may then be used by the adjudication modules of the guarantor system 108 to perform an enhanced adjudication at block 544; some discussion of the nature of the enhanced adjudication was presented above in connection with FIG. 2. If the result of that enhanced adjudication confirms the conclusion that the repudiation was valid, as checked at block 548, then the transaction is one of those that the prior risk analysis failed to identify sufficiently well as likely to be repudiated. Accordingly, the guarantor system 108 initiates transmission of the transaction amount to the merchant bank at block 576 so that the merchant bank may credit the merchant account at block 580. Because of the guaranteed nature of the transaction, such transfer of funds is also performed by the guarantor system 108 when the repudiation is found not to be valid by the enhanced adjudication; in addition, however, the guarantor takes steps to recover payment from the cardholder at block 568, with the expectation that the cardholder will pay the guarantor the requisite amount at block 572 when presented with the evidence that the transaction was improperly repudiated.

Thus, having described several embodiments, it will be recognized by those of skill in the art that various modifications, alternative constructions, and equivalents may be used without departing from the spirit of the invention. Accordingly, the above description should not be taken as limiting the scope of the invention, which is defined in the following claims.

What is claimed is:

1. A method for providing a guarantee to a merchant for a transaction between the merchant and a consumer using the consumer's transaction card issued from an issuer, the method occurring at a third-party guarantor, the method comprising:
  receiving a guarantee request from the issuer for a transaction guarantee, the request including at least transaction information;
  generating a risk score for the credit transaction, wherein the risk score is based at least on the risk of repudiation by the consumer; and
  sending a transaction guarantee to the merchant, wherein the transaction guarantee guarantees payment to the merchant when the consumer repudiates the transaction and the transaction guarantee is based at least on the risk score.

2. The method according to claim 1, wherein the guarantee request is received from the issuer through a financial network.

3. The method according to claim 1, wherein the guarantee request includes a transaction authorization request approved by the issuer.

4. The method according to claim 3, wherein the guarantor sends the approved transaction authorization request to the merchant with the transaction guarantee.

5. The method according to claim 1, wherein the risk score is based on factors including demographic factors.

6. The method according to claim 1, wherein the risk score is based on factors including transaction factors.

7. A non-transitory computer readable medium, that when executed by a computing device of a financial transaction guarantor system performs the steps of:
   communicating with a financial network via a network interface;
   receiving a guarantee request from an issuer of a consumer's transaction card, for a transaction guarantee through the network interface;
   evaluating, by a risk evaluation module, the risk that the consumer associated with a transaction will repudiate the transaction, wherein the risk evaluation is based at least on transaction factors;
   determining, by an adjudication module, whether the guarantor is obliged to pay a merchant for a transaction repudiated by the consumer; and
   sending a transaction guarantee to the merchant, wherein the transaction guarantee guarantees payment to the merchant when the consumer repudiates the transaction, wherein the guarantee is based at least on the risk evaluation.

8. The non-transitory computer readable medium of claim 7, further comprising receiving repudiation requests from a merchant through a repudiation receipt module.

9. The non-transitory computer readable medium of claim 7, further comprising storing at least one of a transaction guarantee and risk evaluation factors related with a risk evaluation for a transaction through a data source.

10. The non-transitory computer readable medium of claim 7, wherein the evaluating further comprises determining a cost for providing the guarantee.

* * * * *